United States Patent
Kobayashi (10) Patent No.: US 10,177,699 B2
(45) Date of Patent: Jan. 8, 2019

(54) MOTOR CONTROL UNIT AND ELECTRIC POWER STEERING APPARATUS EQUIPPED WITH THE SAME

(71) Applicant: NSK LTD., Tokyo (JP)

(72) Inventor: Hideyuki Kobayashi, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/552,903

(22) PCT Filed: Sep. 7, 2016

(86) PCT No.: PCT/JP2016/076290
§ 371 (c)(1),
(2) Date: Aug. 23, 2017

(87) PCT Pub. No.: WO2017/064946
PCT Pub. Date: Apr. 20, 2017

(65) Prior Publication Data
US 2018/0241334 A1  Aug. 23, 2018

(30) Foreign Application Priority Data
Oct. 16, 2015  (JP) .................. 2015-204893

(51) Int. Cl.
*H02P 21/00* (2016.01)
*H02P 21/22* (2016.01)
(Continued)

(52) U.S. Cl.
CPC ............ *H02P 21/22* (2016.02); *B62D 5/0463* (2013.01); *H02P 21/18* (2016.02); *H02P 21/0003* (2013.01); *H02P 27/08* (2013.01)

(58) Field of Classification Search
CPC ...... H02P 21/22; H02P 21/18; H02P 21/0003; H02P 27/08; B62D 5/0463
(Continued)

(56) References Cited

U.S. PATENT DOCUMENTS

2007/0107973 A1*  5/2007  Jiang ................... B62D 5/046
                                                     180/443
2007/0158132 A1*  7/2007  Ta ....................... B62D 5/046
                                                     180/446
(Continued)

FOREIGN PATENT DOCUMENTS

| JP | 2007-325408 A | 12/2007 |
| JP | 2008-211908 A | 9/2008 |
| JP | 2011-223724 A | 11/2011 |

OTHER PUBLICATIONS

International Search Report for PCT/JP2016/076290 dated Dec. 13, 2016 [PCT/ISA/210].
(Continued)

*Primary Examiner* — Bickey Dhakal
*Assistant Examiner* — Gabriel Agared
(74) *Attorney, Agent, or Firm* — Sughrue Mion, PLLC (57) ABSTRACT

A motor control unit that extracts a higher harmonic component, which is contained in back-EMFs of the dq-axis control system, by means of Taylor expansion (Maclaurin expansion), and suppresses a torque variation by precisely correcting a gain and a phase of the higher harmonic component for a q-axis current command value and the electric power steering apparatus equipped with the same. The motor control unit drives a brushless motor having three or more phases by using a vector control on a dq-axis rotary coordinate system.

8 Claims, 10 Drawing Sheets

(51) Int. Cl.
  *B62D 5/04*     (2006.01)
  *H02P 21/18*    (2016.01)
  *H02P 27/08*    (2006.01)

(58) Field of Classification Search
  USPC .................................................. 318/400.02
  See application file for complete search history.

(56) References Cited

U.S. PATENT DOCUMENTS

| 2008/0203958 A1* | 8/2008 | Suzuki ................... B62D 5/046 |
| | | 318/629 |
| 2009/0160381 A1* | 6/2009 | Imura ................. H02P 21/0003 |
| | | 318/400.15 |
| 2009/0167224 A1* | 7/2009 | Miura .................... B62D 5/046 |
| | | 318/400.23 |
| 2014/0125261 A1* | 5/2014 | Yamazaki ........... H02P 21/0039 |
| | | 318/400.02 |
| 2017/0264225 A1* | 9/2017 | Ishikawa ................. H02P 21/05 |

OTHER PUBLICATIONS

Written Opinion for PCT/JP2016/076290 dated Dec. 13, 2016 [PCT/ISA/237].

\* cited by examiner

FIG.1

PRIOR ART

PRIOR ART

MOTOR CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2016/076290 filed Sep. 7, 2016, claiming priority based on Japanese Patent Application No. 2015-204893 filed Oct. 16, 2015, the contents of all of which are incorporated herein by reference in their entirety.

TECHNICAL FIELD

The present invention relates to a motor control unit that vector-controls a driving of a brushless motor on a dq-axis rotary coordinate system, and an electric power steering apparatus (EPS) equipped with the above motor control unit, and in particular to the motor control unit that extracts a higher harmonic component, which is contained in back-EMFs (counter electromotive voltages) of the dq-axis control system, by means of Taylor expansion (Maclaurin expansion), and suppresses a torque variation by precisely correcting a gain and a phase of the higher harmonic component for a q-axis current command value, and to the electric power steering apparatus equipped with the above motor control unit.

The electric power steering apparatus being equipped with the motor control unit assist-controls a steering system of a vehicle by calculating a current command value based on at least a steering torque and driving the brushless motor based on the current command value via an inverter.

BACKGROUND ART

An electric power steering apparatus which provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

Figure 1:
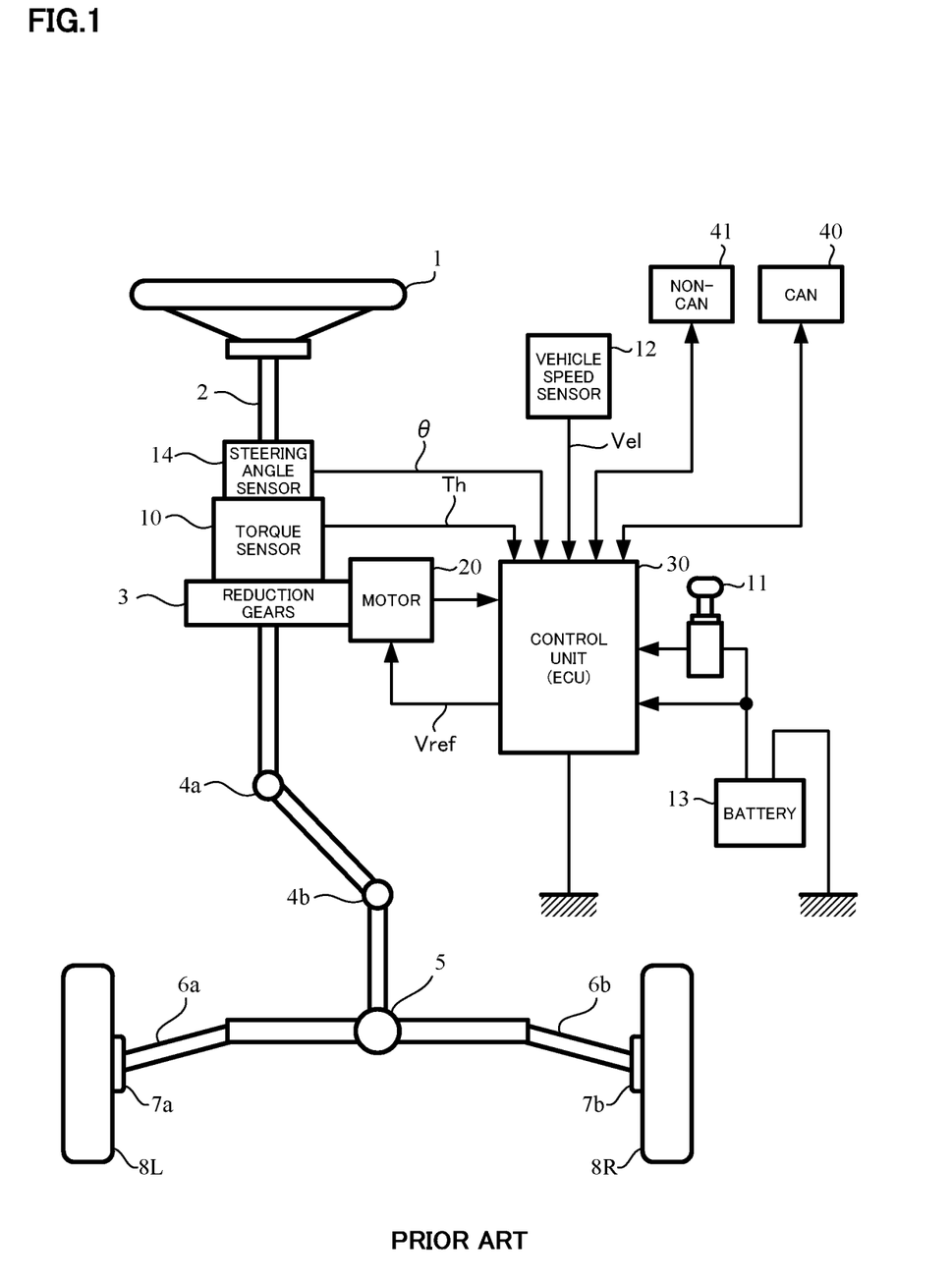
FIG. 1 is a configuration diagram illustrating a general outline of an electric power steering apparatus.

A general configuration of the conventional electric power steering apparatus will be described with reference to FIG. 1. As shown in FIG. 1, a column shaft (a steering shaft or a handle shaft) 2 connected to a steering wheel (handle) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value. A steering angle sensor 14 is not indispensable and may not be provided. It is possible to obtain the steering angle from a rotational position sensor which is connected to the motor 20.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

Figure 2:
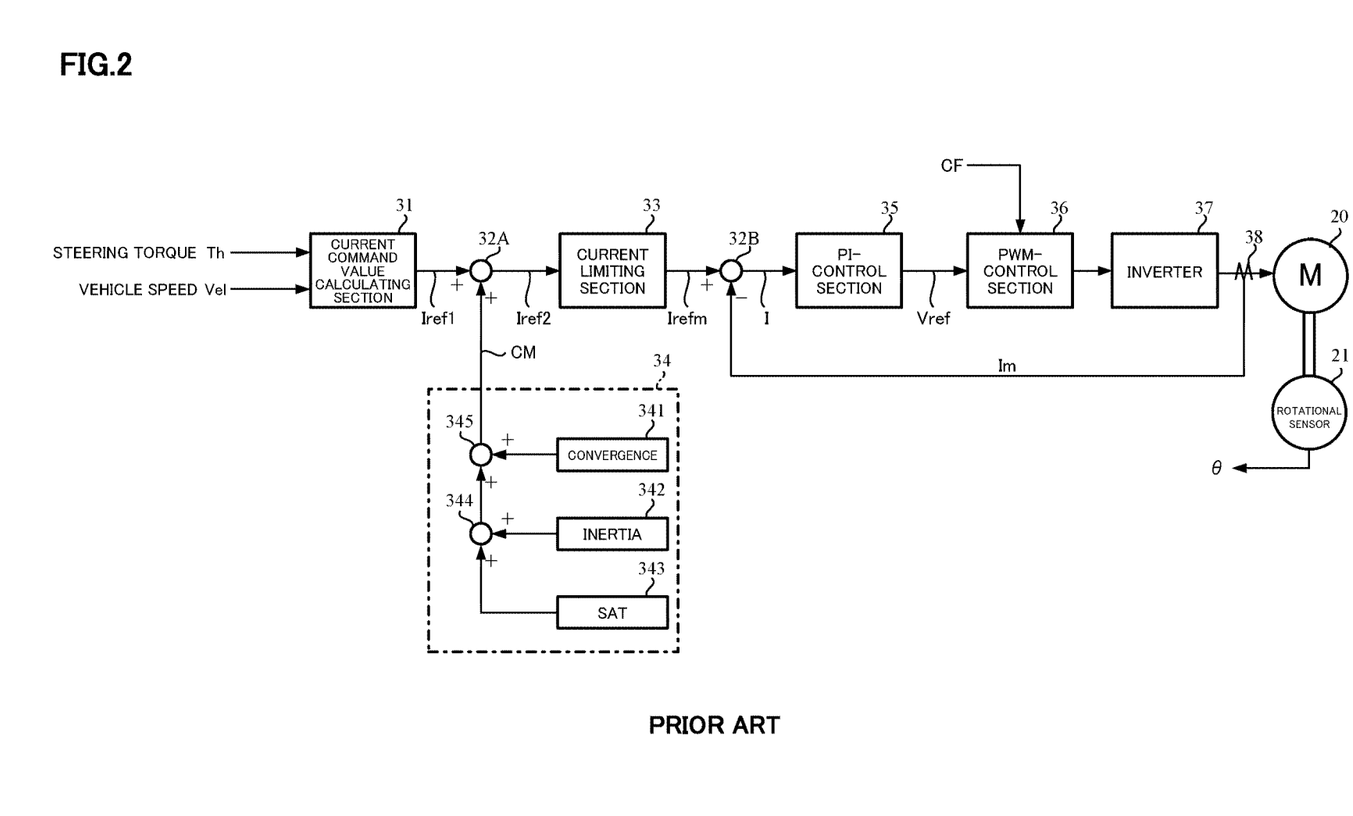
FIG. 2 is a block diagram showing a general configuration example of a control system of the electric power steering apparatus.

In such an electric power steering apparatus, the control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a current command value calculating section 31. The current command value calculating section 31 calculates a current command value Iref1 based on the steering torque Th and the vehicle speed Vel by using an assist map or the like. The calculated current command value Iref1 is added with a compensation signal CM for improving characteristics from a compensating section 34 at an adding section 32A. The current command value Iref2 after the addition is limited the maximum value thereof at a current limiting section 33. The current command value Irefm limited the maximum value is inputted into a subtracting section 32B, whereat a detected motor current value Im is subtracted from the current command value Irefm.

The subtraction result I (=Irefm−Im) in the subtracting section 32B is current-controlled at the current control section 35 such as a proportional-integral (PI) control and so on. The voltage control value Vref obtained by the current control is inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback. Further, a rotational sensor 21 such as a resolver is connected to the motor 20 and a motor angle $\theta_m$ is detected and is inputted.

The compensating section 34 adds a self-aligning torque (SAT) detected or estimated and an inertia compensation value 342 at an adding section 344. The addition result is further added with a convergence control value 341 at an adding section 345. The addition result is inputted into the adding section 32A serving as the compensation signal CM, thereby to improve the control characteristics.

In such a motor control unit, a vector control method that controls currents corresponding to respective axes (a d-axis current command value and a q-axis current command value) by using the vector since an angle relationship between the d-axis being a coordinate axis of a rotor of a three-phase brushless motor and the q-axis controlling strength of a magnetic field of the three-phase brushless motor is 90° and the q-axis and the d-axis are independent, is known.

Figure 3:
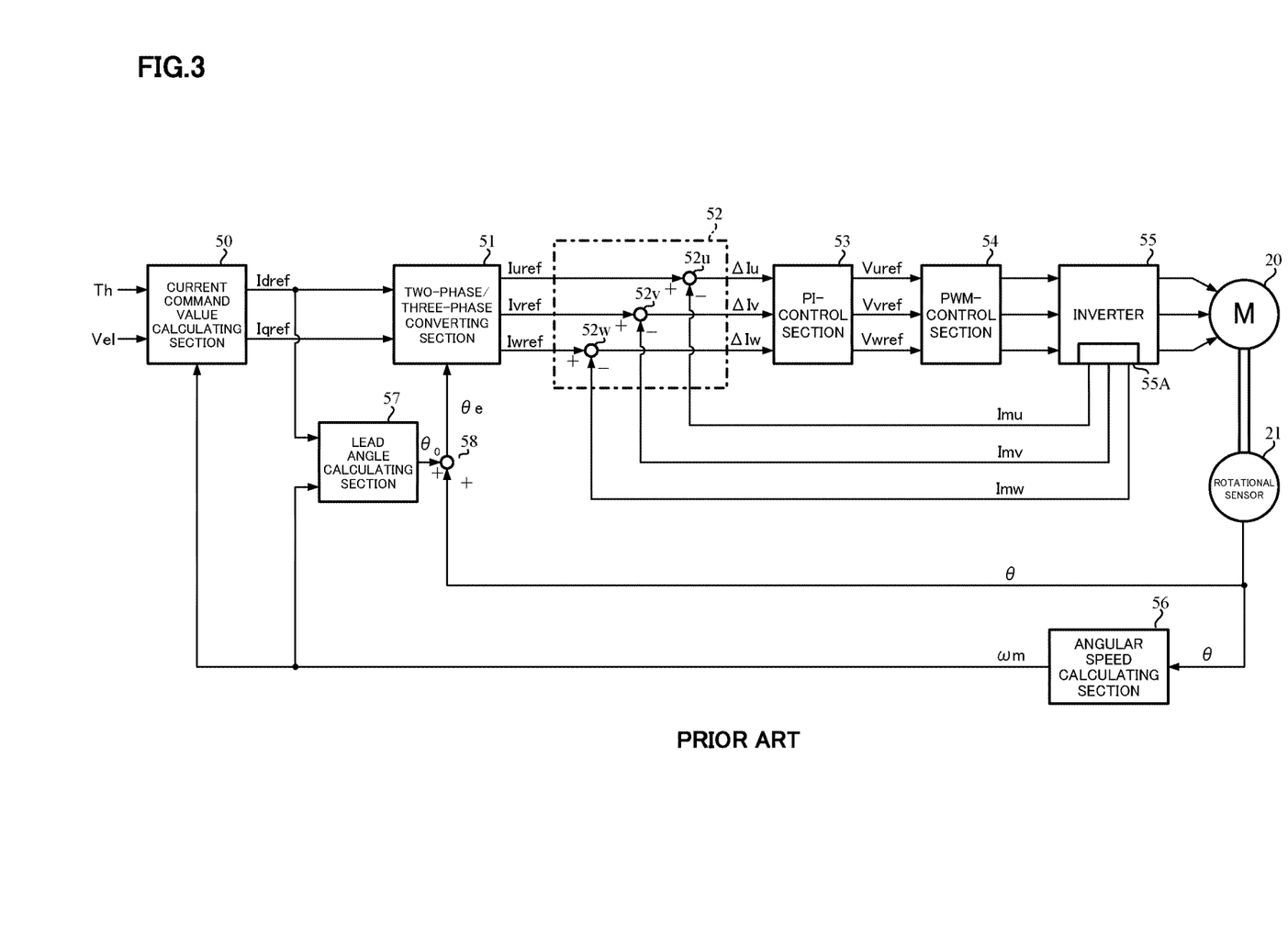
FIG. 3 is a block diagram illustrating a configuration example (three-phase feedback type) of a vector-control method.

An example of the vector control method is shown in FIG. 3. An angular speed calculating section 56 to calculate a motor angular speed ωm from a motor angle (a rotational angle) θ is provided, and the calculated motor angular speed ωm is inputted into a current command value calculating section 50 and a lead angle calculating section 57. The current command value calculating section 50 calculates a d-axis current command value $I_{dref}$ and a q-axis current command value $I_{qref}$ of a dq-axis coordinate system of two axes based on the steering torque (torque command value) Th and the vehicle speed Vel, the d-axis current command value $I_{dref}$ and the q-axis current command value $I_{qref}$ are inputted into a two-phase/three-phase converting section 51, and the two-phase/three-phase converting section 51 outputs three-phase current command value $I_{uref}$, $I_{vref}$ and $I_{wref}$ based on a motor angle $\theta_e$ being lead-angle corrected. That is, the current command value calculating section 50 calculates a current command value $I_{ref}$ based on the steering torque Th and the vehicle speed Vel, and calculates the d-axis current command value $I_{dref}$ and the q-axis current command value $I_{qref}$ based on the calculated current command value $I_{ref}$ and the motor angular speed ωm. The d-axis current command value $I_{dref}$ is inputted into the lead angle calculating section 57, and the calculated lead angle $\theta_0$ is inputted into an adding section 58. The corrected motor angle $\theta_e$ is calculated by adding the lead angle $\theta_0$ to the motor angle θm, and the motor angle $\theta_e$ is inputted into the two-phase/three-phase converting section 51.

The three-phase current command values $I_{uref}$, $I_{vref}$ and $I_{wref}$ outputted from the two-phase/three-phase converting section 51, are respectively inputted into a subtracting section 52 (subtracting sections 52u, 52v and 52w), and deviations ΔIu, ΔIv and ΔIw which are subtracted respective phase currents Imu, Imv and Imw being detected at a motor current detecting section 55A from the current command values $I_{uref}$, $I_{vref}$ and $I_{wref}$, are calculated at the subtracting sections 52. The deviations ΔIu, ΔIv and ΔIw are inputted into a PI-control section 53, and further the motor 20 is driving-controlled via a PWM-control section 54 and an inverter 55.

Although the three-phase currents are fed-back in the vector control method as shown in FIG. 3, a two-phase feedback type motor control unit that feedbacks the motor detecting current being performed a three-phase/two-phase conversion (U-phase, V-phase and W-phase currents→dq-axis currents), is also known (for example, Japanese Unexamined Patent Publication No. 2008-211908 A: Patent Document 1). In the unit of Patent Document 1, the method that obtains respective phase currents which have a desired torque based on a back-EMF measured-value between motor terminals and obtains dq-axis current command values by performing the three-phase/two-phase conversion, is disclosed. Further, in the unit of Patent Document 1, a torque ripple due to a strain component being contained in the back-EMF measured-value is compensated.

THE LIST OF PRIOR ART DOCUMENTS

Patent Documents

Patent Document 1: Japanese Unexamined Patent Publication No. 2008-211908 A

Patent Document 2: Japanese Unexamined Patent Publication No. 2011-223724 A

SUMMARY OF THE INVENTION

Problems to be Solved by the Invention

However, in the unit of Patent Document 1, in a case that the motor rotates in a high speed, the compensation of the higher harmonic component in the strain component of the back-EMF measured-value can be insufficient due to an influence of a control bandwidth of the current feedback control.

Furthermore, Japanese Unexamined Patent Publication No. 2011-223724 A (Patent Document 2) discloses that an apparatus calculates a correction value for performing a feed-forward based on the current command value, the rotational angle and the angular speed so as to cancel the torque ripple which is generated from the higher harmonic component of an induced voltage of the motor, and corrects the current command value by using the calculated correction value.

However, since the feed-forward control is easily affected by errors of a motor resistance and a motor inductance, there is a fear that the compensation of the torque ripple is not sufficiently performed. Further, Patent Document 2 discloses that the compensation which is caused by the fifth order and the seventh order higher harmonics of the induced voltage is added to the dq-axis current command values. However, Patent Document 2 does not entirely disclose a relationship between the fifth order and the seventh order higher harmonics of the induced voltage and the compensation value which is added to the dq-axis axial current command values.

The present invention has been developed in view of the above-described circumstances, and an object of the present invention is to provide the motor control unit that extracts a higher harmonic component, which is contained in back-EMFs of the dq-axis control system, by means of Taylor expansion (Maclaurin expansion), and suppresses a torque variation by precisely correcting a gain and a phase of the higher harmonic component for a q-axis current command value and the electric power steering apparatus equipped with the motor control unit.

Means for Solving the Problems

The present invention relates to a motor control unit that drives a brushless motor having three or more phases by using a vector control on a dq-axis rotary coordinate system, the above-described object of the present invention is achieved by that comprising: a current command value calculating section to calculate a d-axis current command value $i_d$ and a q-axis current command value $i_q$ based on a torque command value $\tau_c$ for the brushless motor, a rotational angle $\theta_e$ and a motor angular speed ω of the brushless motor, wherein the current command value calculating section extracts a higher harmonic component, which is contained in dq-axis back-EMFs of the brushless motor, by means of Taylor expansion, and corrects a gain and a phase of the higher harmonic component with a gain increasing and a phase lead, respectively, so as to compensate an attenuation due to a current control bandwidth.

The above-described object of the present invention is more efficiently achieved by that: wherein the q-axis current command value $i_q$ is represented by "$i_q = (\frac{2}{3} \cdot \tau_c \cdot \omega - e_d \cdot i_d)/e_q$", and higher harmonic components of "$\omega/e_q$" and "$e_d/e_q$" are extracted when a d-axis back-EMF is set as $e_d$ and a q-axis back-EMF is set as $e_q$; or wherein a calculating processing section in the current command value calculating section comprises a first adding section to add a lead angle from a lead angle correcting section to the rotational angle $\theta_e$, a first extracting section to extract an alternative current (AC) component of "$\omega/e_q$" based on an adding result of the first adding section, a second extracting section to extract only an AC component of "$e_d/e_q$" based on the adding result of the first adding section, a third extracting section to extract a direct current (DC) component of "$\omega/e_q$", first and second multiplying sections to multiply outputs of the first extracting section and the second extracting section by a correcting gain, a first calculating section to obtain a q-axis first correcting signal based on a multiplying result of the first multiplying section, the DC component and the d-axis current command value $i_d$, a second calculating section to obtain a q-axis second correcting signal based on a multiplying result of the second multiplying section and the d-axis current command value $i_d$, and a subtracting section to output the q-axis current command value $i_q$ by subtracting the q-axis second correcting signal from the q-axis first correcting signal; or wherein a lead angle characteristic of a lead angle correcting section in the calculating processing section is non-linearly led for the motor angular speed $\omega$; or wherein a characteristic of a gain correcting section in the calculating processing section non-linearly or linearly increases for the motor angular speed $\omega$.

The above-described object of the present invention is achieved by an electric power steering apparatus equipped with the above motor control unit.

Effects of the Invention

According to the motor control unit of the present invention, since the higher harmonic component, which is contained in the back-EMF of the dq-axis control system, by means of Taylor expansion (Maclaurin expansion in neighbor zero), is extracted, and the gain and the phase of the higher harmonic component is corrected, a precise correcting can easily be performed, and the torque variation of a motor output can be suppressed.

By the electric power steering apparatus equipped with the above motor control unit, it is possible to provide the electric power steering apparatus having a high-performance ECU.

MODE FOR CARRYING OUT THE INVENTION

A motor control unit of the present invention can apply to a three-phase or more brushless motor, extracts higher harmonic components, which are contained in a back-EMF of a dq-axis control system, by means of Taylor expansion (Maclaurin expansion in neighbor zero), and corrects gains and phases of the higher harmonic components with a gain increasing and a phase lead for a q-axis current command value. That is, there is provided a current command value calculating section to calculate a d-axis current command value $i_d$ and a q-axis current command value $i_q$ based on a torque command value $\sigma_c$, a rotational angle $\theta_e$ and a motor angular speed $\omega$ of the brushless motor. The current command value calculating section extracts the higher harmonic components (especially, the fifth order and the seventh order) which are contained in a dq-axis back-EMF by means of Taylor expansion (Maclaurin expansion in neighbor zero), and corrects the gains and the phases of the higher harmonic components with the gain increasing and the phase leads, respectively, so as to compensate an attenuation due to a current control bandwidth. When a d-axis back-EMF is set as $e_d$ and a q-axis back-EMF is set as $e_q$, the q-axis current command value $i_q$ is represented by "$i_q = (\frac{2}{3} \tau_c \cdot \omega - e_d \cdot i_d)/e_q$", and the higher harmonic components of "$\omega/e_q$" and "$e_d/e_q$" are extracted. In this way, it is possible to easily perform a precise correction and suppress the torque variation of the motor output.

By mounting the above motor control unit in an electric power steering apparatus, it is possible to provide the electric power steering apparatus having a high-performance ECU.

Hereinafter, embodiments according to the present invention will be described with reference to the accompanying drawings.

In a control method according to the present invention for the brushless motor, a calculation of the q-axis current command value $i_q$, which decreases the torque variation due to an influence of the higher harmonic components contained in a motor back-EMF, is performed. A calculating equation of the q-axis current command value $i_q$ is represented by the following Equation 1 (for example, refer to Japanese Unexamined Patent Publication No. 2004-201487 A by the present applicant).

$$i_q = \frac{\frac{2}{3} \tau_c \cdot - e_d \cdot i_d}{e_q} = \frac{2}{3} \frac{\omega}{e_q} \cdot \tau_c - \frac{e_d}{e_q} \cdot i_d \quad \text{[Equation 1]}$$

$\omega$: motor rotational speed [rad./s]

$\tau_c$: torque command value [Nm]

$e_d$: d-axis motor back-EMF [V]
$e_q$: q-axis motor back-EMF [V]
$i_d$: d-axis current command value [A]
$i_q$: q-axis current command value [A]

Since the higher harmonic components of the back-EMF are contained in "$\omega/e_q$" and "$e_d/e_q$" of the above Equation 1, a component which decreases a torque ripple due to the back-EMF harmonic components, is contained in the q-axis current command value $i_q$. On the other hand, because a response from the current command value to a current value is determined by a control bandwidth of a current feedback control, an amplitude of the higher frequency component is small and the phase is delayed. Since the higher harmonic components are a function of the motor rotational speed (angular speed), an ability to suppress the torque variation decreases as the motor rotates higher speed. Therefore, by precisely correcting the gains and the phases of the higher harmonic components which are contained in "$\omega/e_q$" and "$e_d/e_q$" of the above Equation 1, it is possible to ensure the ability to suppress the torque variation in the high-speed rotation. In the present invention, the higher harmonic components to be corrected are obtained by using Taylor expansion (Maclaurin expansion in neighbor zero).

By considering the fifth order and the seventh order higher harmonics, the back-EMFs are represented by the below Equation 2.

$$e_u = K_1\omega(\sin(\theta_e) + r_5\sin(5\theta_e) + r_7\sin(7\theta_e))$$
$$e_v = K_1\omega\left(\sin\left(\theta_e - \frac{2}{3}\pi\right) + r_5\sin\left(5\left(\theta_e - \frac{2}{3}\pi\right)\right) + r_7\sin\left(7\left(\theta_e - \frac{2}{3}\pi\right)\right)\right)$$
$$e_w = K_1\omega\left(\sin\left(\theta_e - \frac{4}{3}\pi\right) + r_5\sin\left(5\left(\theta_e - \frac{4}{3}\pi\right)\right) + r_7\sin\left(7\left(\theta_e - \frac{4}{3}\pi\right)\right)\right)$$

[Equation 2]

$e_u$, $e_v$, $e_w$: back-EMFs of U-phase, V-phase and W-phase [V]
$r_5$, $r_7$: the fifth order and the seventh order containing rates for the first order component
$\omega$: motor rotational speed [rad./s]
$\theta_e$: motor electric angle [rad./s]

Here, when the back-EMFs on the dq-axes are obtained by using a three-phase/two-phase conversion formula of the below Equation 3, the below Equation 4 is established. As well, the back-EMFs on the dq-axes are represented by the sixth order higher harmonic.

$$\begin{bmatrix} e_d \\ e_q \end{bmatrix} = \frac{2}{3} \begin{bmatrix} \cos(\theta_e) & \cos\left(\theta_e - \frac{2}{3}\pi\right) & \cos\left(\theta_e + \frac{2}{3}\pi\right) \\ \sin(\theta_e) & \sin\left(\theta_e - \frac{2}{3}\pi\right) & \sin\left(\theta_e + \frac{2}{3}\pi\right) \end{bmatrix} \begin{bmatrix} e_u \\ e_v \\ e_w \end{bmatrix}$$

[Equation 3]

$$e_d = K_5\omega\sin(6\theta_e) + K_7\omega\sin(6\theta_e)$$
$$= K_1(r_5\omega\sin(6\theta_e) + r_7\omega\sin(6\theta_e))$$
$$e_q = K_1\omega - K_5\omega\cos(6\theta_e) + K_7\omega\cos(6\theta_e)$$
$$= K_1(\omega - r_5\omega\cos(6\theta_e) + r_7\omega\cos(6\theta_e))$$

[Equation 4]

$e_d$: d-axis motor back-*EMF*[V]
$e_q$: q-axis motor back-*EMF*[V]

A generating method of the motor current to suppress the torque variation due to the higher harmonic components of the motor back-EMF, is represented by the following Equation 5 as disclosed in, for example, Japanese Unexamined Patent Publication No. 2004-201487 A.

$$i_q = \frac{\frac{2}{3}\tau_c \cdot \omega - e_d \cdot i_d}{e_q}$$

[Equation 5]

Substituting the Equation 3 and the Equation 4 for the Equation 5, the following Equation 6 is established.

$$i_q = \frac{\frac{2}{3}\tau_c \cdot \omega - (K_5\omega\sin(6\theta_e) + K_7\omega\sin(6\theta_e)) \cdot i_d}{K_1\omega - K_5\omega\cos(6\theta_e) + K_7\omega\cos(6\theta_e)}$$
$$= \frac{1}{K_1 - K_5\cos(6\theta_e) + K_7\cos(6\theta_e)}\frac{2}{3}\tau_c -$$
$$\frac{K_5\sin(6\theta_e) + K_7\sin(6\theta_e)}{K_1 - K_5\cos(6\theta_e) + K_7\cos(6\theta_e)}i_d$$
$$= \frac{1}{K_1(1 - r_5\cos(6\theta_e) + r_7\cos(6\theta_e))}\frac{2}{3}\tau_c -$$
$$\frac{r_5\sin(6\theta_e) + r_7\sin(6\theta_e)}{1 - r_5\cos(6\theta_e) + r_7\cos(6\theta_e)}i_d$$

[Equation 6]

Figure 4A:
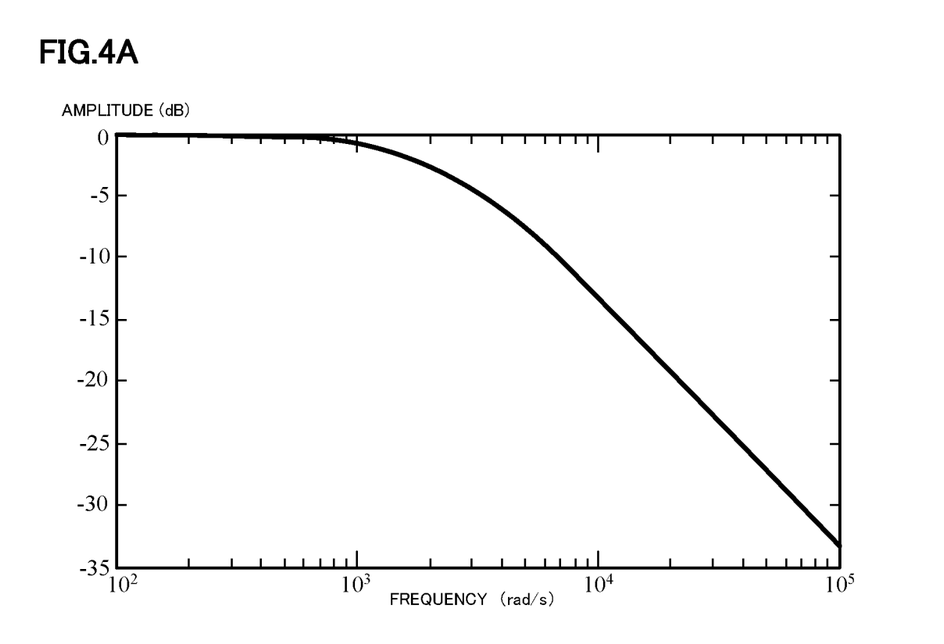
FIG. 4A and FIG. 4B are Bode charts illustrating a characteristic example of a current control.
Figure 4B:
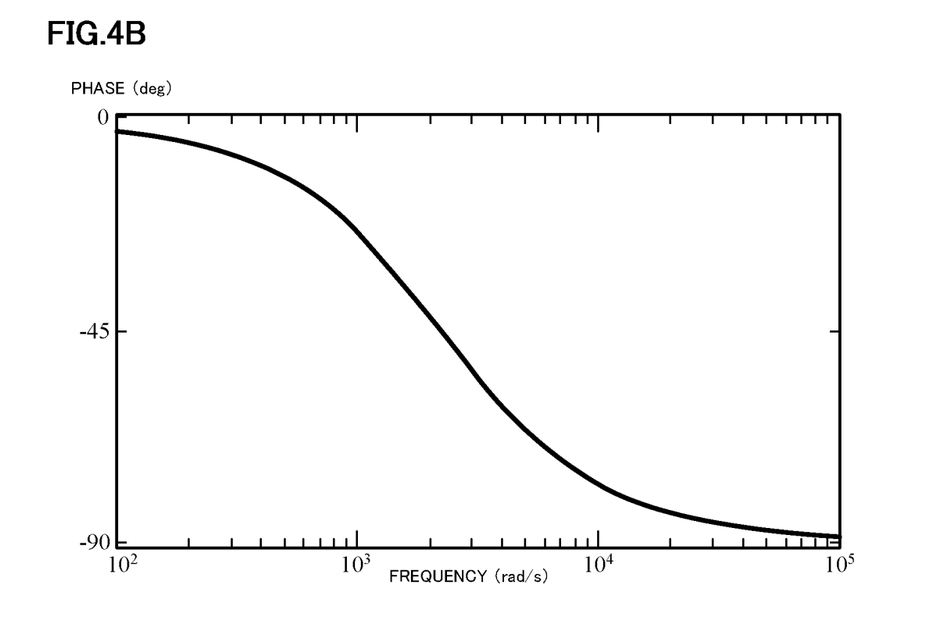

A frequency characteristic of the current control is generally a low-pass-filter (LPF) characteristic as shown in FIGS. 4A and 4B. Since a variation of the motor angle $\theta_e$ in the Equation 6 is large when the rotational speed is high, the frequency of an alternative current (AC) component included in the q-axis current command value $i_q$ becomes high. Consequently, because the AC component contained in the q-axis current command value $i_q$ is attenuated due to the frequency characteristic of the current control and then becomes an actual current, the current represented by the Equation 5 is turned down, a high frequency torque ripple is generated and an operating sound is worsen.

In order to prevent from a decrement in the higher harmonic components, in the present invention, the AC component is extracted from the Equation 6. As considering the Equation 6, it is impossible to pull out a function part of the motor angle $\theta_e$ in a form of an addition and a multiplication. Thus, it is necessary to separate the function part of the motor angle $\theta_e$ and a non-function part of the motor angle $\theta_e$ by means of Taylor expansion. At first, the first term of the Equation 6 will be considered.

$$\frac{1}{1 + (r_7 - r_5)\cos(6\theta_e)} \rightarrow \frac{1}{1 + (r_7 - r_5)\cos(\theta)} = f(\theta)$$

[Equation 7]

The first term of the Equation 6 is set as the above Equation 7, and Taylor expansion is represented by the following Equation 8.

$$f(\theta) =$$
$$f(0) + f'(0)\theta + \frac{f''(0)}{2!}\theta^2 + \frac{f'''(0)}{3!}\theta^3 + \ldots = \sum_{n=0}^{\infty} \frac{f^{(n)}(0)}{n!}\theta^n$$

[Equation 8]

The first term of a right-hand side of the Equation 8 does not depend on the motor angle $\theta_e$. A calculated result of the first term is represented by the below Equation 9.

$$f(0) = \frac{1}{1+(r_7-r_5)\cos(0)} = \frac{1}{1+(r_7-r_5)} \quad \text{[Equation 9]}$$

Accordingly, a part depending on the motor angle $\theta_e$ is represented by the below Equation 10.

$$\frac{1}{1+(r_7-r_5)\cos(6\theta_e)} - \frac{1}{1+(r_7-r_5)} \quad \text{[Equation 10]}$$

It is possible to in advance obtain the values of the Equation 10 as a function of the motor angle $\theta_e$ with reference to a look-up table or the like.

Next, the second term of the above Equation 6 will be considered.

$$\frac{(r_5+r_7)\sin(6\theta_e)}{1+(r_7-r_5)\cos(6\theta_e)} \rightarrow \frac{(r_5+r_7)\sin(\theta)}{1+(r_7-r_5)\cos(\theta)} = g(\theta) \quad \text{[Equation 11]}$$

The first term of Taylor expansion formula is calculated from the Equation 11, and then the below Equation 12 is established.

$$g(0) = \frac{(r_5+r_7)\sin(0)}{1+(r_7-r_5)\cos(0)} = \frac{(r_5+r_7)(0)}{1+(r_7-r_5)(1)} = 0 \quad \text{[Equation 12]}$$

Therefore, it is understood that a term which is not dependent on the motor angle $\theta_e$ does not exist in a function $g(\theta)$, and it is possible to in advance obtain the function $g(\theta)$ with reference to the look-up table or the like.

The processes of the gain increasing and the phase lead are performed for the AC component which is lastly extracted. Amounts of the gain increasing and the phase lead are set so as to cancel an attenuation in the current control bandwidth.

The present invention relates to the motor control unit that vector-controls on the dq-axis rotary coordinate system, and in particular to correct the q-axis current command value $i_q$ in the current command value calculating section. The present invention is capable of applying to a three-phase feedback type vector-control on the dq-axis rotary coordinate system as shown in FIG. 5 or a two-phase feedback type vector-control on the dq-axis rotary coordinate system as shown in FIG. 6.

Figure 5:
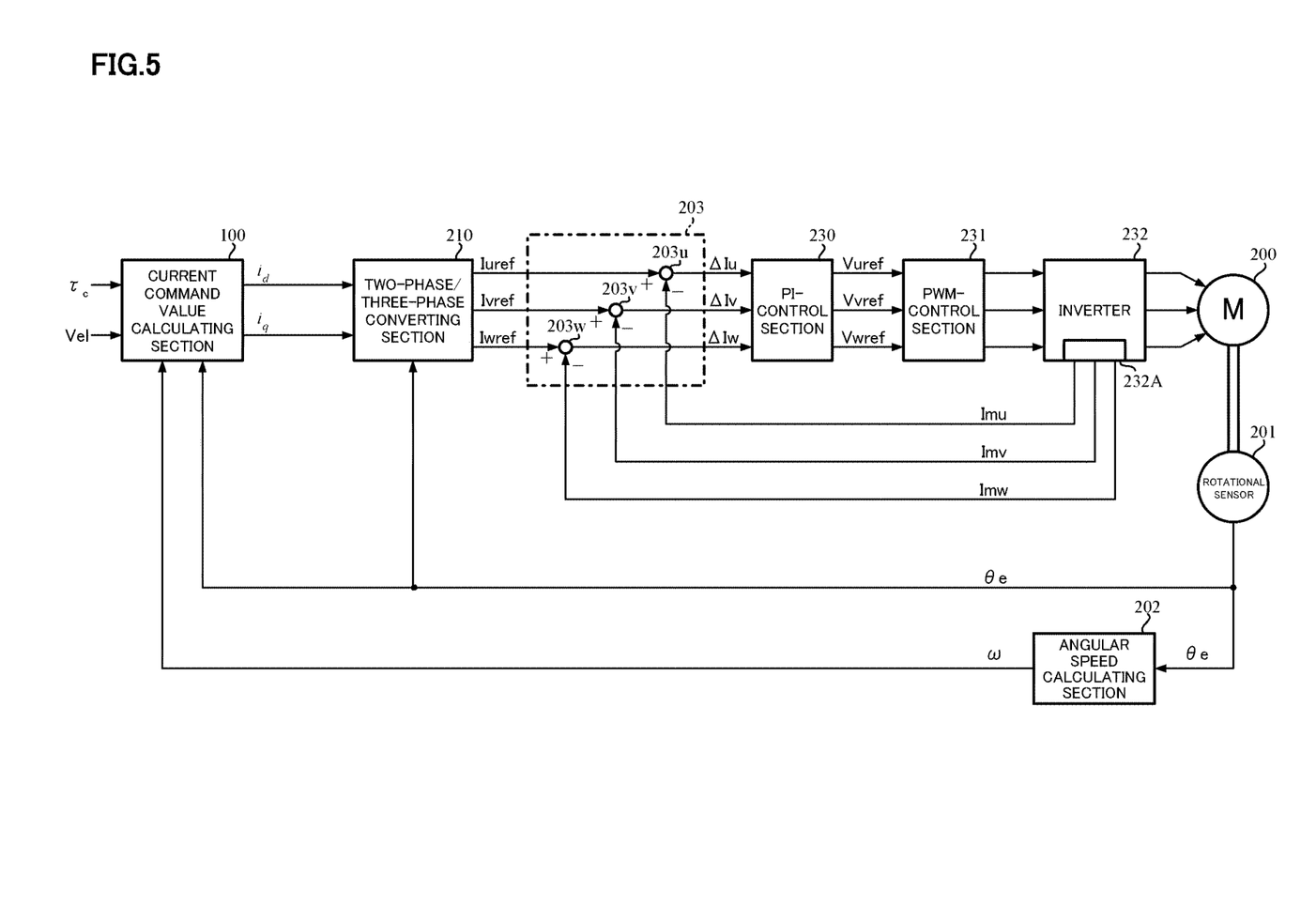
FIG. 5 is a block diagram illustrating a configuration example of the three-phase feedback type vector control system according to the present invention.

In the vector-control system shown in FIG. 5, there is provided a current command value calculating section 100 to calculate and correct the d-axis current command value $i_d$ and the q-axis current command value $i_q$, and the torque command value $\tau_c$, the vehicle speed Vel, the motor angle (rotational angle) $\theta_e$ from a rotational sensor 201 which is couple to the motor 200, and the motor angular speed $\omega$ which is calculated at an angular speed calculating section 202, are inputted into the current command value calculating section 100. The d-axis current command value $i_d$ and the q-axis current command value $i_q$ calculated at the current command value calculating section 100 are inputted into a two-phase/three-phase converting section 210 and are converted to three-phase current command values $I_{uref}$, $I_{vref}$ and $I_{wref}$ in synchronization with the motor angle $\theta_e$. The three-phase current command values $I_{uref}$, $I_{vref}$ and $I_{wref}$ are inputted into a subtracting section 203 (203u, 203v and 203w), and deviations (differences) $\Delta Iu$, $\Delta Iv$ and $\Delta Iw$ between the motor currents Imu, Imv and Imw detected at a current detecting section 232A and the current command values $I_{uref}$, $I_{vref}$ and $I_{wref}$ are respectively calculated at the subtracting sections 203u, 203v and 203w. The calculated deviations $\Delta Iu$, $\Delta Iv$ and $\Delta Iw$ are inputted into a PI-control section 230, the current-controlled three-phase voltage control command values $V_{uref}$, $V_{vref}$ and $V_{wref}$ are inputted into a PWM-control section 231, and a motor 200 is driven via an inverter 232 based on respective phase duties which are calculated at the PWM-control section 231.

In FIG. 5, although a current detecting circuit 232A is provided in the inverter 232, it is also possible to detect the current by a supply wiring to the motor 200 or the like.

Figure 6:
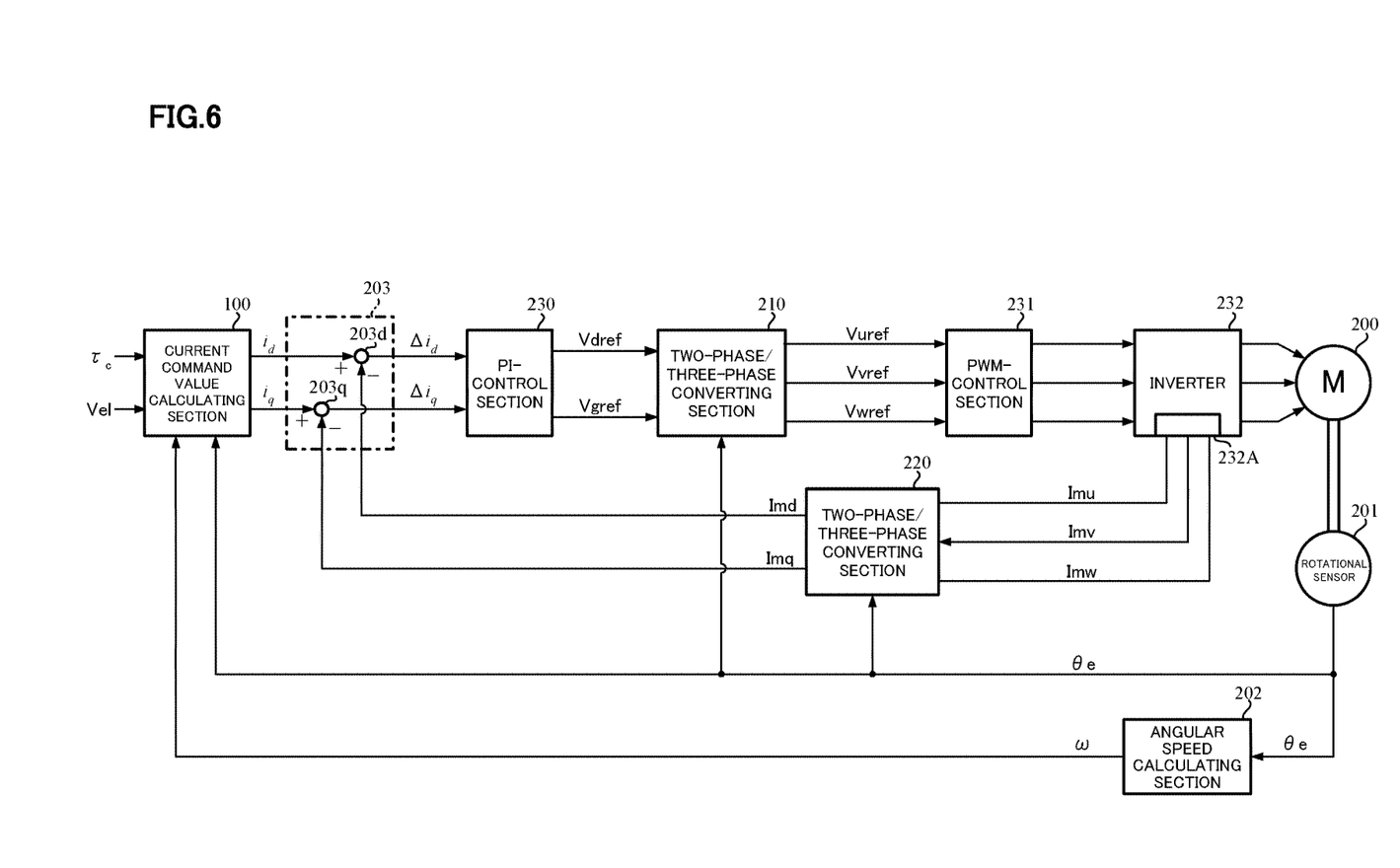
FIG. 6 is a block diagram illustrating a configuration example of the two-phase feedback type vector control system according to the present invention.

Further, in the vector-control system shown in FIG. 6, there is provided a three-phase/two-phase converting section 220 which converts the three-phase motor currents Imu, Imv and Imw detected at the current detecting circuit 232A to two-phase currents Imd and imq in synchronization with the motor angle $\theta_e$. The d-axis current command value $i_d$ and the q-axis current command value $i_q$ which are calculated and corrected at the current command value calculating section 100 are inputted into a subtracting section 203 (203d and 203q), and deviations $\Delta I_d$ and $\Delta I_q$ between the two-phase currents Imd and Imq from the three-phase/two-phase converting section 220 and the d-axis current command value $I_d$ and the q-axis current command value $I_q$, are respectively calculated at the subtracting sections 203d and 203q. The deviations $\Delta I_d$ and $\Delta I_q$ are inputted into the PI-control section 230, the PI-controlled voltages $V_{dref}$ and $V_{qref}$ are inputted into the two-phase/three-phase converting section 210, and the converted three-phase voltage control command values $V_{uref}$, $V_{vref}$ and $V_{wref}$ are inputted into the PWM-control section 231. Subsequent operations are similar to those of FIG. 5.

The control system shown in FIG. 5 is a three-phase feedback type which the three-phase motor currents Imu, Imv and Imw are fed-back, and the control system shown in FIG. 6 is a two-phase feedback type which the three-phase motor currents Imu, Imv and Imw are converted to the two-phase currents Imd and Imq, and the two-phase currents Imd and Imq are fed-back.

Figure 7:
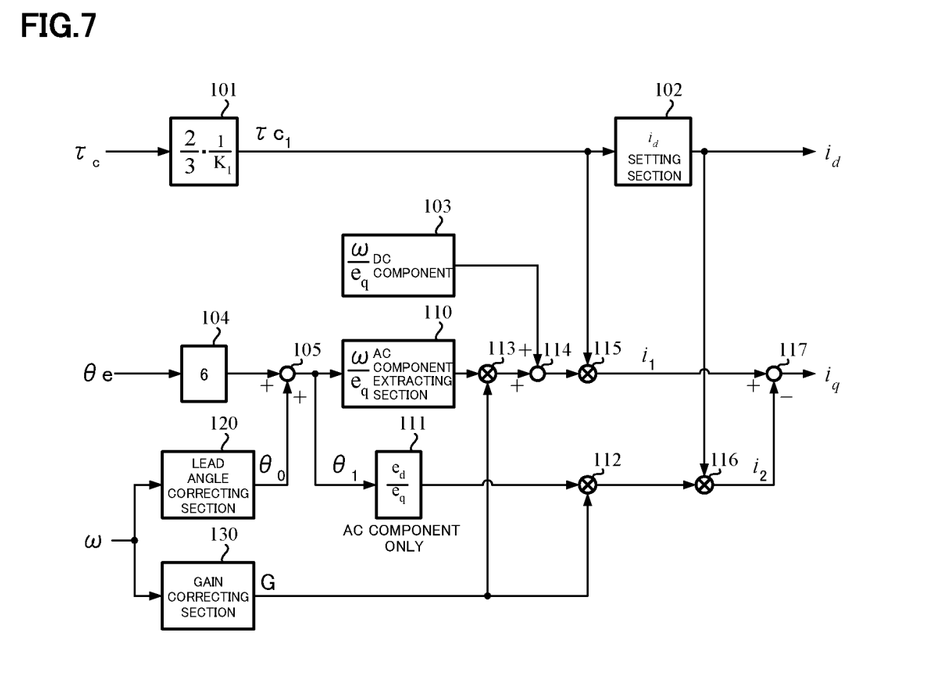
FIG. 7 is a block diagram illustrating a configuration example of a current command value calculating section according to the present invention.

According to the explanations on the above Equations 2 to 12, the current command value calculating section 100 has a configuration as shown in FIG. 7. That is, a direct current (DC) component section ($\omega/e_q$) 103 corresponding to the Equation 9, an AC component section ($\omega/e_q$) 110 corresponding to the Equation 10, and a part of an AC component only ($e_d\omega/e_q$) 111 corresponding to the Equation 11 are provided in the current command value calculating section 100. The torque command value $\tau_c$ is inputted into a gain section 101, and the torque command value $\tau_{c1}$ is inputted into a multiplying section 115 which configures a first calculating section and an $i_d$-setting section 102. The $i_d$-setting section 102 outputs the d-axis current command value $i_d$. The d-axis current command value $i_d$ is inputted into a multiplying section 116 which configures a second calculating section. The motor angle $\theta_e$ is multiplied by six at a gain section 104, and then is inputted into an adding section 105.

The motor angular speed $\omega$ is inputted into the lead angle correcting section 120 and the gain correcting section 130, a lead angle $\theta_0$ from the lead angle correcting section 120 is added to the multiplied motor angle at the adding section 105, and the added motor angle $\theta_1$ is inputted into the AC component sections 110 and 111. The AC component which is extracted at the AC component section 110 is inputted into the multiplying section 113 which configures the first calculating section, and the AC component which is extracted at an extracting section 130 is inputted into a multiplying section 112. A correcting gain G from the gain correcting section 130 is inputted into the multiplying section 113 of the first calculating section, and the multiplying section 112 of the second calculating section.

The DC component ($\omega/e_q$) of the DC component section 103 is inputted into an adding section 114 of the first calculating section, and the multiplied result of the multiplying section 113 is also inputted into the adding section 114. The added result of the adding section 114 is inputted into the multiplying section 115, and is multiplied by the torque command value $\tau_{c1}$. A current value $i_1$ which is the multiplied result is adding-inputted into a subtracting section 117. The multiplied result of the multiplying section 112 is inputted into the multiplying section 116, and is multiplied by the d-axis current command value $i_d$. A current value $i_2$ which is the multiplied result is subtracting-inputted into a subtracting section 117. A subtracting "$i_1-i_2=i_q$" is performed at the subtracting section 117, and the q-axis current command value $i_q$ which is the subtracted result is outputted.

Figure 8:
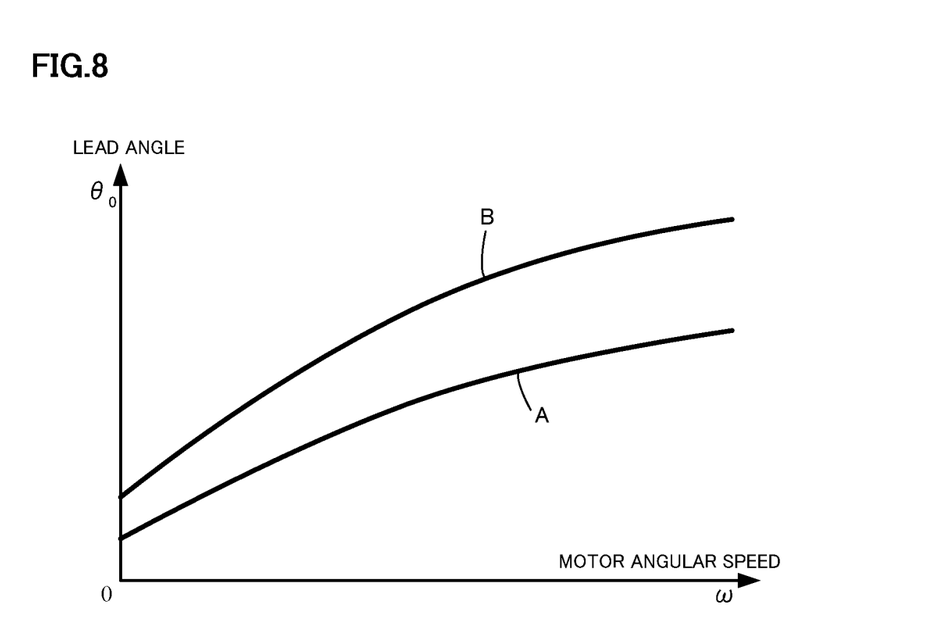
FIG. 8 is a characteristic diagram illustrating a characteristic example of an advance angle correcting section.
Figure 9:
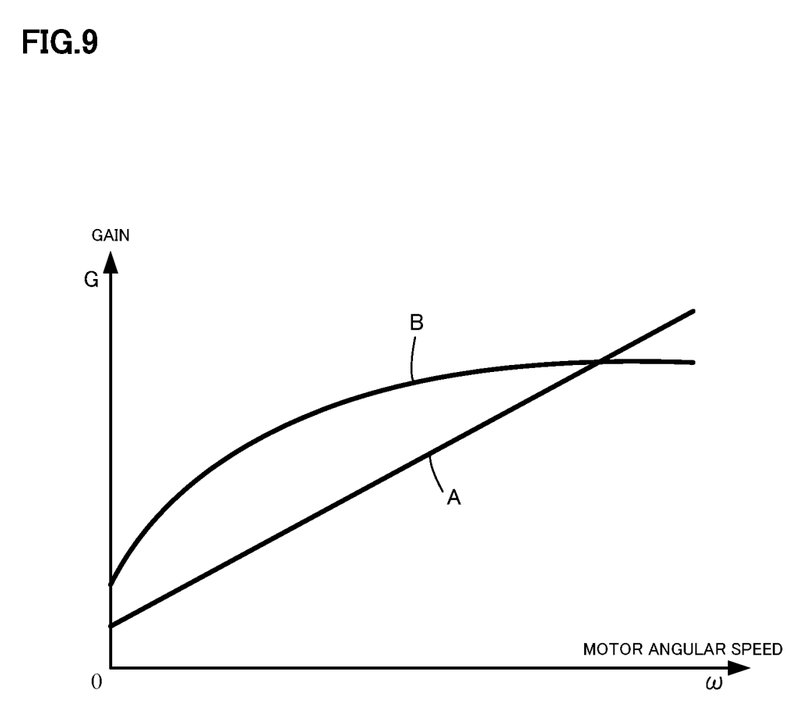
FIG. 9 is a characteristic diagram illustrating a characteristic example of a gain correcting section.

For example, as shown in FIG. 8, the lead angle calculating section 120 has a lead angle characteristic "A" or "B" which gradually increases in nonlinear corresponding to the motor angular speed $\omega$. However, it is possible to freely set an increasing characteristic and an increasing rate in a range of canceling the attenuation in the current control bandwidth. Further, f or example, as shown in FIG. 9, the gain correcting section 130 has a gain characteristic "A" which gradually increases in linear corresponding to the motor angular speed $\omega$, or a gain characteristic "B" which gradually increases in nonlinear corresponding to the motor angular speed $\omega$. It is possible to freely set an increasing characteristic and an increasing rate in a range of canceling the attenuation in the current control bandwidth.

Figure 10:
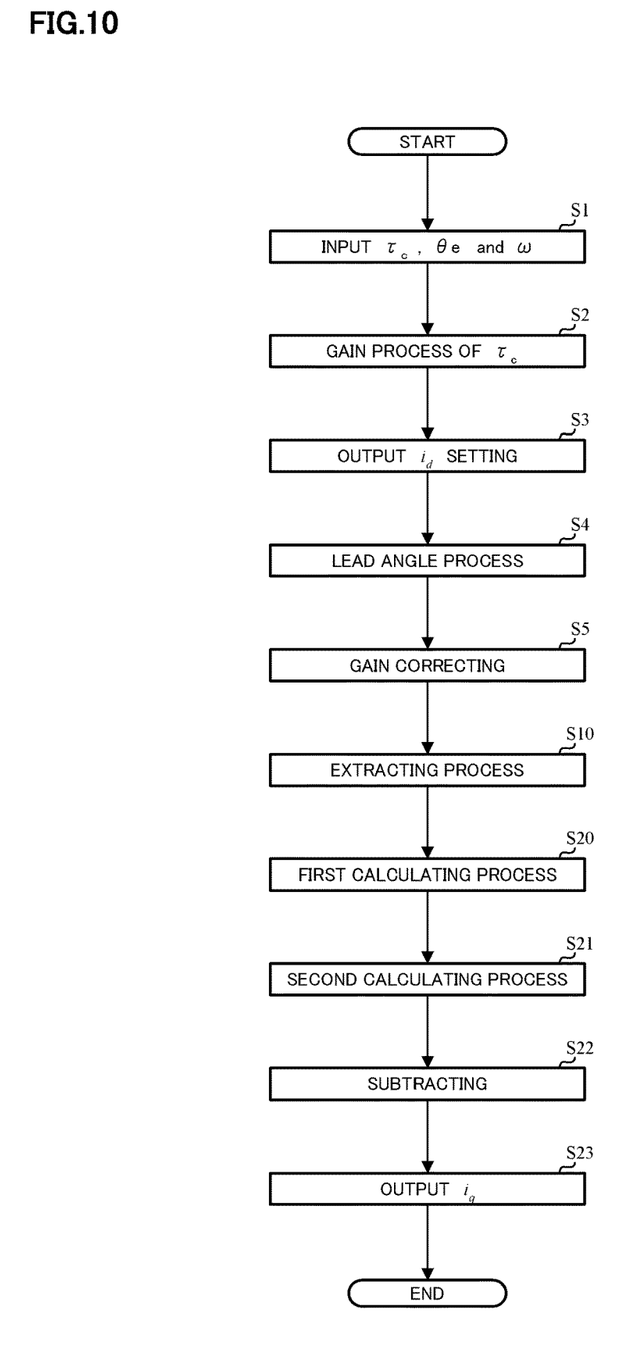
FIG. 10 is a flowchart illustrating an operation example of the present invention (the current command value calculating section)

In such a configuration, an operation example will be described with reference to a flowchart shown in FIG. 10.

At first, the torque command value $\tau_c$, the motor angle $\theta_e$ and the motor angular speed $\omega$ are inputted (Step S1), and the torque command value $\tau_{c1}$ which the torque command value $\tau_c$ is multiplied by the gain ($\frac{2}{3} \cdot 1/K_1$) at the gain section 101, is inputted into the multiplying section 115 and the $i_d$-setting section 102 (Step S2). The $i_d$-setting section 102 sets and outputs the d-axis current command value $i_d$, and inputs the d-axis current command value $i_d$ into the multiplying section 116 (Step S3).

The motor angle $\theta_e$ is multiplied by the gain (six times), and then is inputted into the adding section 105. The motor angular speed $\omega$ is inputted into the lead angle correcting section 120, and the lead angle correcting section 120 calculates the lead angle $\theta_0$. The lead angle $\theta_0$ is inputted into the adding section 105 and is lead-angle-processed (Step S4). Further, the motor angular speed $\omega$ is gain-corrected at the gain correcting section 130, and the correcting gain G is inputted into the multiplying sections 113 and 112 (Step S5).

The lead-angle-processed motor angle $\theta_1$ being the added result at the adding section 105 is extracting-processed at the AC component sections 110 and 111, and the DC component is extracted at the DC component section 103 (Step S10). The extracted AC component is multiplied by the correcting gain G at the multiplying section 113, the multiplied result is added to the extracted DC component at the adding section 114, the added result is multiplied by the torque command value $\tau_{c1}$ at the multiplying section 115 (Step S20), and the current value $i_1$ being the multiplied result is inputted into the subtracting section 117. The AC component which is extracted at the AC component section 111, is multiplied by the correcting gain G at the multiplying section 112, the multiplied result is multiplied by the d-axis current command value $i_d$ at the multiplying section 116 (Step S21), and the current value $i_2$ being the multiplied result is inputted into the subtracting section 117. The subtracting "$i_1-i_2=i_q$" is performed at the subtracting section 117 (Step S22), and the q-axis current command value $i_q$ as the subtracting result is outputted (Step S23).

Figure 11A:
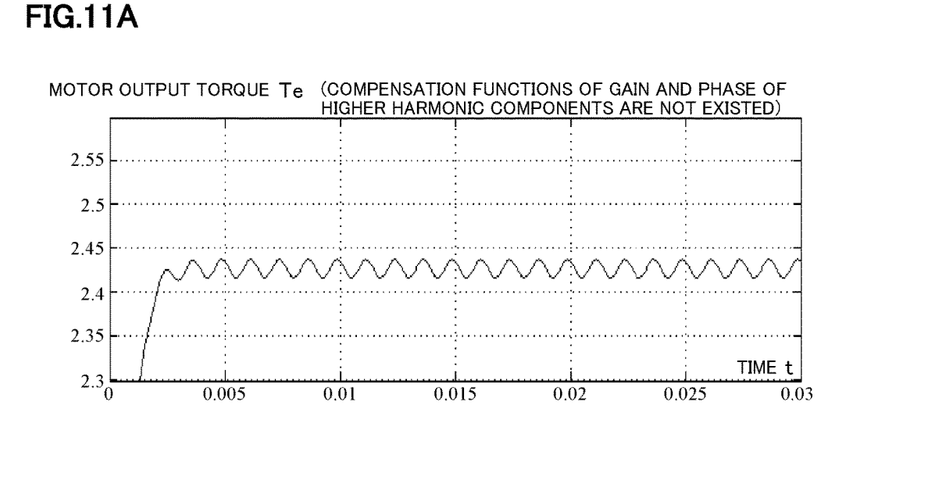
FIG. 11A and FIG. 11B are time charts illustrating simulation results which indicate an effect of the present invention.
Figure 11B:
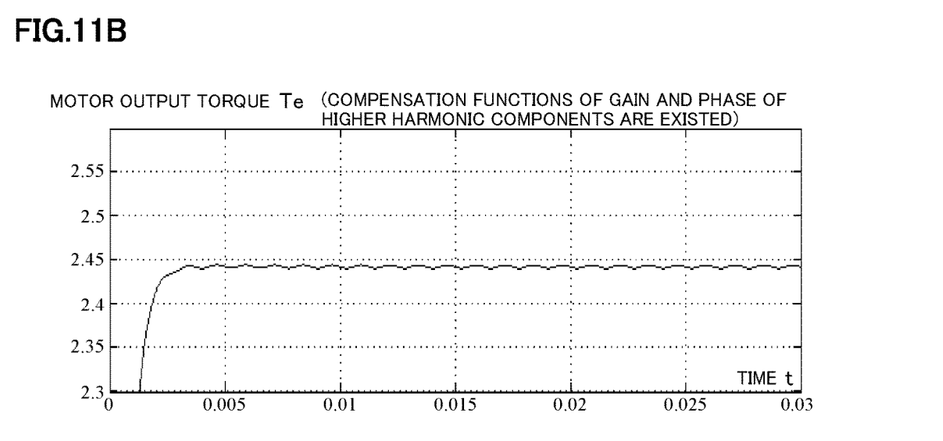

FIG. 11A and FIG. 11B show simulation results of the present invention, FIG. 11A is a characteristic of a prior art example which the gain and the phase of the higher harmonic components are not compensated, and FIG. 11B is a characteristic of the present invention which the gain and the phase of the higher harmonic components are compensated. As is clear from the above figures, the variation of the motor output torque is remarkably suppressed by the compensation of the present invention.

Although the examples of the three-phase motor are described in the above embodiments, it is possible that this technique is used to multi-phase motors which vector-control is applicable.

EXPLANATION OF REFERENCE NUMERALS 1 handle
2 column shaft (steering shaft, handle shaft)
10 torque sensor
12 vehicle speed sensor
13 battery
20, 200 motor
30 control unit (ECU)
31 current command value calculating section
35 PI-control section
36, 231 PWM-control section
37, 232 inverter
100 current command value calculating section
120 lead angle correcting section
130 gain correcting section
201 rotational sensor
202 angular speed calculating section
210 two-phase/three-phase converting section
220 three-phase/two-phase converting section

The invention claimed is:
1. A motor control unit that drives a brushless motor having three or more phases by using a vector control on a dq-axis rotary coordinate system, comprising:
 a current command value calculating section to calculate a d-axis current command value $i_d$ and a q-axis current command value $i_q$ based on a torque command value $\tau_c$ for said brushless motor, a rotational angle $\theta_e$ and a motor angular speed $\omega$ of said brushless motor by using the vector control on the dq-axis rotary coordinate system,
 wherein said current command value calculating section extracts a higher harmonic component, which is contained in dq-axis counter electromotive voltages (back-EMFs) of said brushless motor, by means of Taylor expansion, and corrects a gain and a phase of said higher harmonic component with a gain increasing and a phase lead, respectively, so as to compensate an attenuation due to a current control bandwidth, wherein a calculating processing section in said current command value calculating section comprises:

a first adding section to add a lead angle from a lead angle correcting section to said rotational angle $\theta_e$, a first extracting section to extract an alternating current (AC) component of "$\omega/e_q$" based on an adding result of said first adding section, a second extracting section to extract only an AC component of "$e_d/e_q$" based on said adding result of said first adding section, a third extracting section to extract a direct current (DC) component of "$\omega/e_q$", first and second multiplying sections to multiply respective outputs of said first extracting section and said second extracting section by a correcting gain, a first calculating section to obtain a q-axis first correcting signal based on a multiplying result of said first multiplying section, said DC component and said d-axis current command value $i_d$, a second calculating section to obtain a q-axis second correcting signal based on a multiplying result of said second multiplying section and said d-axis current command value $i_d$, and a subtracting section to output said q-axis current command value $i_q$ by subtracting said q-axis second correcting signal from said q-axis first correcting signal, wherein a d-axis back-EMF is set as $e_d$ and a q-axis back-EMF is set as $e_q$.

2. The motor control unit according to claim 1, wherein said q-axis current command value $i_q$ is represented by "$i_q=(\frac{2}{3}\tau_c\cdot\omega - e_d \cdot i_d)/e_q$", and higher harmonic components of "$\omega/e_q$" and "$e_d/e_q$".

3. The motor control unit according to claim 1, wherein a lead angle characteristic of a lead angle correcting section in said calculating processing section is non-linearly led for said motor angular speed $\omega$.

4. The motor control unit according to claim 2, wherein a lead angle characteristic of a lead angle correcting section in said calculating processing section is non-linearly led for said motor angular speed $\omega$.

5. The motor control unit according to claim 1, wherein a characteristic of a gain correcting section in said calculating processing section non-linearly or linearly increases for said motor angular speed $\omega$.

6. The motor control unit according to claim 2, wherein a characteristic of a gain correcting section in said calculating processing section non-linearly or linearly increases for said motor angular speed $\omega$.

7. An electric power steering apparatus that is equipped with said motor control unit according to claim 1, and applies an assist force to a steering system of a vehicle by a current command value which is calculated based on at least a steering torque.

8. An electric power steering apparatus that is equipped with said motor control unit according to claim 2, and applies an assist force to a steering system of a vehicle by a current command value which is calculated based on at least a steering torque.

* * * * *